(12) United States Patent
Maeda et al.

(10) Patent No.: US 10,416,653 B2
(45) Date of Patent: Sep. 17, 2019

(54) PARAMETER SETTING DEVICE AND PARAMETER SETTING METHOD

(71) Applicant: FANUC CORPORATION, Yamanashi (JP)

(72) Inventors: Kazuomi Maeda, Yamanashi-ken (JP); Kunihiro Honma, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/484,567

(22) Filed: Apr. 11, 2017

(65) Prior Publication Data

US 2017/0300036 A1    Oct. 19, 2017

(30) Foreign Application Priority Data

Apr. 15, 2016 (JP) ................................. 2016-081829

(51) Int. Cl.
G05B 19/408 (2006.01)
G05B 19/042 (2006.01)

(52) U.S. Cl.
CPC ..... G05B 19/4083 (2013.01); G05B 19/0426 (2013.01); G05B 2219/25065 (2013.01); G05B 2219/33119 (2013.01); G05B 2219/36046 (2013.01)

(58) Field of Classification Search
CPC .................. G05B 19/4083; G05B 2219/36046
See application file for complete search history.

(56) References Cited

U.S. PATENT DOCUMENTS

| 2002/0049512 A1* | 4/2002 | Mizuno ............ G05B 19/41845 700/169 |
| 2006/0253838 A1* | 11/2006 | Fujii ................... G06F 9/44505 717/124 |
| 2015/0295759 A1* | 10/2015 | Mollersten .......... H04L 41/0843 709/222 |

FOREIGN PATENT DOCUMENTS

| JP | 3110508 U | 11/1991 |
| JP | 2002108425 A | 4/2002 |
| JP | 2006227721 A | 8/2006 |
| JP | 200752505 A | 3/2007 |
| JP | 2009295056 A | 12/2009 |

OTHER PUBLICATIONS

English Abstract and Machine Translation for Japanese Publication No. 2009-295056 A, published Dec. 17, 2009, 26 pgs.

(Continued)

*Primary Examiner* — Yuhui R Pan
(74) *Attorney, Agent, or Firm* — Fredrikson & Byron, P.A.

(57) ABSTRACT

A parameter setting device sets parameters for driving a machine in which a numerical controller is incorporated. The parameter setting device uses a machine configuration file in which information is described pertaining to the configuration of the machine. Furthermore, the parameter setting device is equipped with a parameter generating unit for generating parameters based on the machine configuration file, and a parameter setting unit for setting the generated parameters in the numerical controller.

10 Claims, 12 Drawing Sheets

(56) References Cited

OTHER PUBLICATIONS

English Abstract and Machine Translation for Japanese Publication No. 2006-227721 A, published Aug. 31, 2006, 5 pgs.
English Abstract and Machine Translation for Japanese Publication No. 2002-108425 A, published Apr. 10, 2002, 10 pgs.
English Abstract and Machine Translation for Japanese Publication No. 2007-052505 A, published Mar. 1, 2007, 9 pgs.
English Machine Translation for Japanese Publication No. 03-110508 U, published Nov. 13, 1991, 3 pgs.

* cited by examiner

FIG. 3A

ORDER INFORMATION — 50 (48)

```
NUMERICAL
CONTROLLER:SERIAL NO. □□□□
BASIC FUNCTION:     H501#D4G1
FORM/SRAM:          H057
PACKAGE:            H530
NUMBER OF
CONTROL PATHS:      S801#1
NUMBER OF
CONTROLLED AXES:    J802#3
NUMBER OF
SPINDLE AXES:       J802#0
NUMBER OF
MACHINE GROUPS:     J836#1
SYNCHRONOUS CONTROL: J843
NUMBER OF SERVO MOTORS:J398#3
MOTOR MODELS:       aiS22/6000,
                    aiS22/6000,
                    aiS30/4000,
 . . .
```

CONNECTION INFORMATION — 52 (48)

```
SERVO BUS SLAVE 1:  X
SERVO BUS SLAVE 2:  Y
SERVO BUS SLAVE 3:  Z
```

MACHINE INFORMATION — 54 (48)

```
AXIS NAMES:         X, Y, Z
EXTERNAL DETECTORS: 0, 0, 0
UNITS OF MOTION:    mm
 . . .
```

MACHINE CONFIGURATION FILE — 46

```
[SYSTEM CONFIGURATION]
SERIES =D4G1
NUMBER OF PATHS =1
NUMBER OF CONTROLLED AXES =3
NUMBER OF SPINDLE AXES =0
AXIS NAMES =X,Y,Z
[AXES]
UNITS OF MOTION
OF LINEAR AXES = mm SYSTEM
[MOTOR AND AMPLIFIER TYPES]
MOTOR MODELS =aiS22/6000,
              aiS22/6000,
              aiS30/4000,
 . . .
[SERVO BUS CONNECTIONS]
SV1=X
SV2=Y
SV3=Z
 . . .
```

PARAMETERS — 56

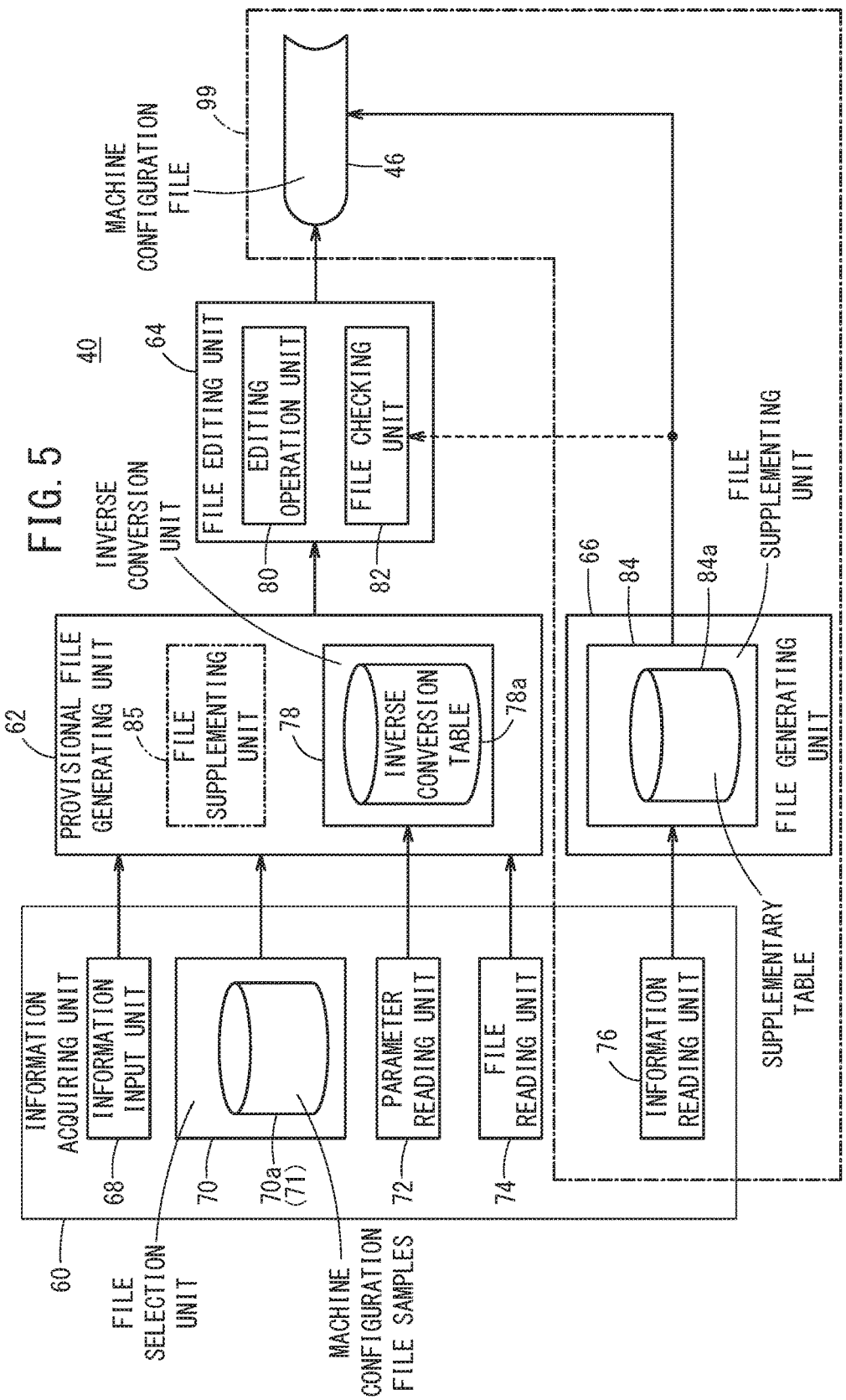

PARAMETER SETTING DEVICE AND PARAMETER SETTING METHOD

CROSS-REFERENCE TO RELATED APPLICATION

This application is based upon and claims the benefit of priority from Japanese Patent Application No. 2016-081829 filed on Apr. 15, 2016, the contents of which are incorporated herein by reference.

BACKGROUND OF THE INVENTION

Field of the Invention

The present invention relates to a parameter setting device and a parameter setting method for setting parameters for driving a machine in a numerical controller.

Description of the Related Art

A numerical controller is incorporated in a machine such as a machine tool or an industrial robot. By a numerical control, the numerical controller operates a plurality of axes provided in the machine. This type of numerical controller is supplied to a machine manufacturing site for manufacturing machine tools and the like from a factory that manufactures numerical controllers, and is incorporated into a machine by the manufacturing operator at the machine manufacturing site. In addition, after incorporation thereof, in the numerical controller, parameters (information concerning mechanical configurations and electrical configurations) for driving the machine are set corresponding to the machine configuration, by manual input of the parameters by the manufacturing operator. Furthermore, the machine in which the numerical controller is incorporated is shipped to a site of use where workpieces are machined.

Thereafter, as disclosed in Japanese Laid-Open Patent Publication No. 2009-295056, Japanese Laid-Open Patent Publication No. 2006-227721, and Japanese Laid-Open Patent Publication No. 2002-108425, in the numerical controller and the machine, parameters for forming a machined object during use thereof (hereinafter referred to as machining parameters, in order to distinguish them from the parameters for driving the machine) are set by a machine operator at the site of use, and machining of workpieces is carried out.

SUMMARY OF THE INVENTION

Incidentally, in machines equipped with numerical controllers, since there are many types of structures (servo motors and the like) for driving axes, the parameters for driving such machines, which are set at a time that initial settings are made, inevitably become enormous and complex. Accordingly, when a numerical controller is introduced, a manufacturing operator at the machine manufacturing site must expend significant effort in setting the parameters for driving the machine. In particular, since parameters for driving the machine must conform to the actual machine configuration, conventionally, it has been difficult for a factory worker to set such parameters in the numerical controller at a time of shipment from the factory where the numerical controller was manufactured (hereinafter also referred to simply as an operator, concerning the manufacturing operator and the factory worker).

The present invention has been devised taking into consideration the aforementioned circumstances, and has the object of providing a parameter setting device and a parameter setting method in which, by facilitating the setting of parameters for driving a machine, the amount of effort expended by an operator can be significantly reduced.

To accomplish the above object, the present invention is characterized by a parameter setting device configured to set parameters for driving a machine in which a numerical controller is incorporated, including a machine configuration file in which information is described pertaining to a configuration of the machine, a parameter generating unit configured to generate parameters for driving the machine, based on the machine configuration file, and a parameter setting unit configured to set the generated parameters in the numerical controller.

As discussed above, the parameter setting device includes the machine configuration file, the parameter generating unit, and the parameter setting unit, whereby the parameter setting device is capable of easily setting parameters for driving the machine. More specifically, the machine configuration file in which information is described pertaining to the machine configuration can be converted easily into parameters for driving the machine, by the parameter generating unit, with a minimum of manual labor by the operator. Thus, for example, since it is possible to set parameters for driving the machine at a time of shipment from the factory, it is possible to significantly reduce the labor required for the operator to set parameters at the machine manufacturing site.

In this case, the machine configuration file may contain order information including information of a model of the numerical controller, a type and number of motors, and a type and number of amplifiers, connection information indicative of wire connections in the machine, and machine information including information of a configuration of axes of the machine.

In this manner, by including in the machine configuration file the order information, the connection information, and the machine information, the parameter setting device can easily and accurately generate parameters for driving the machine from the machine configuration file.

In addition to the above configuration, the parameter setting device may further include a file construction unit configured to acquire or generate the machine configuration file.

In this manner, by further being equipped with the file construction unit, the parameter setting device can easily acquire or generate the machine configuration file, and supply the machine configuration file to the parameter generating unit.

Further, the file construction unit preferably includes a file supplementing unit having a supplementary table including the order information, the connection information, and the machine information, and in the case that a portion from among the order information, the connection information, and the machine information is insufficient in the machine configuration file that was acquired or generated by the file construction unit, the file supplementing unit preferably supplements the insufficient portion of the information automatically from the supplementary table.

In this manner, by providing the file construction unit with the file supplementing unit, even if information from among the order information, the connection information, and the machine information is insufficient, the information can be supplemented by the file supplementing unit, and the parameters can be generated from the machine configuration file. Further, for example, although there is a possibility that the machine configuration file cannot be made, due to wire connections of an amplifier not having been decided at a stage of shipment from the factory or the like, by supplementing the insufficient portion as a general machine configuration, it is possible to eliminate an inconvenience in which the machine configuration file cannot be created and used for setting of the parameters.

Further, when automatically supplementing the insufficient portion of the information from the supplementary table, in the case that information requiring confirmation by the operator is to be added, the file supplementing unit may add information indicative of non-confirmation to the machine configuration file, and the parameter generating unit, when generating the parameters for driving the machine, may generate a parameter indicative of non-confirmation on the basis of the information indicative of non-confirmation.

More specifically, in the case that an item that requires confirmation in order to conform to the condition of the machine (for example, connection information, or machine information such as the pitch of a ball screw, etc.) is incorrect, if the numerical controller were to drive the motor, there is a possibility of causing a malfunction in the machine. Therefore, in the case that information requiring confirmation is added, by generating parameters indicative of non-confirmation, the parameter setting device sets the parameters indicative of non-confirmation in the numerical controller. Thus, by not driving the machine based on the parameters indicative of non-confirmation, the numerical controller can avoid machine failures or the like.

In addition, the parameter setting device may further include an automatic setting unit configured to automatically generate the machine configuration file with the file construction unit, and to supply the machine configuration file to the parameter generating unit.

In this manner, the automatic setting unit automatically creates the machine configuration file with the file construction unit, whereby all of the processes from acquisition of information up to generation of the parameters can be performed automatically, thereby further simplifying such operations.

Furthermore, the file construction unit may include a storage medium in which there is stored as a sample the machine configuration file of a typical machine, and may acquire the machine configuration file that is stored in the storage medium.

In accordance with this feature, by acquiring the machine configuration file of a typical machine, the parameter setting device can enable the operator to more easily set the parameters.

Further, in this case, the storage medium may store as samples a plurality of the machine configuration files, and the file construction unit may include a sample selection unit configured to acquire a machine configuration file selected by an operator from among the plurality of the machine configuration files stored in the storage medium.

In this manner, by providing the sample selection unit, when the operator selects a machine configuration file having a similar machine configuration from among the samples of the machine configuration files, the parameter setting device can easily generate the machine configuration file using the selected machine configuration file.

Still further, the file construction unit may include an inverse conversion unit configured to acquire parameters of a similar machine, and to perform conversion from the acquired parameters into the machine configuration file.

In this manner, by being equipped with the inverse conversion unit, for example, the parameter setting device can generate the machine configuration file by inversely converting the parameters of a similar machine that was used formerly at the machine manufacturing site. Further, even if the model of the numerical controller is different, based on the inversely converted machine configuration file, the inverse conversion unit can generate and set the parameters of the different model, and versatility thereof can further be enhanced.

Further still, the file construction unit may include a file acquisition unit configured to acquire the machine configuration file that was already created.

In this manner, by acquiring a machine configuration file already created by the file acquisition unit, the file construction unit can more easily generate the parameters using the already created machine configuration file.

In this instance, the file construction unit may include a file editing unit configured to edit or check the machine configuration file that was acquired or generated.

In this manner, by providing the file editing unit, the file construction unit can easily allow the contents of the acquired or generated machine configuration file to be changed or corrected by the operator.

Further, the parameter setting device may further include a model selecting unit configured to select a different model of the numerical controller, and the parameter generating unit may include a conversion table for each model selected by the model selecting unit, and may generate the parameters from the machine configuration file on the basis of the conversion table of the selected model.

In this manner, by including a conversion table for each model, the parameter generating unit can generate parameters with higher accuracy from the machine configuration file, depending on the model of the numerical controller.

Furthermore, the parameter setting device may further include an output unit configured to output the machine configuration file to the numerical controller.

In this manner, by the output unit outputting the machine configuration file to the numerical controller, the parameter setting device can also set parameters using the parameter generating unit and the parameter setting unit of the numerical controller. Further, the machine configuration file can also be used by another machine that sets parameters.

Furthermore, for accomplishing the aforementioned object, the present invention also is characterized by a parameter setting method for setting parameters for driving a machine in which a numerical controller is incorporated, including a step of acquiring or generating a machine configuration file in which information is described pertaining to a configuration of the machine, a parameter generating step of generating, by a parameter generating unit of a device, parameters for driving the machine based on the machine configuration file, and a parameter setting step of setting, by a parameter setting unit of a device, the generated parameters in the numerical controller.

With the parameter setting device and the parameter setting method according to the present invention, it is possible to facilitate the setting of parameters for driving a machine, and the amount of effort expended by an operator can be significantly reduced.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A is an explanatory diagram showing an example of information when generating a machine configuration file from source information, and generating parameters for driving the machine from the machine configuration file;

FIG. 3B is an explanatory diagram in which a portion of the parameters shown in FIG. 3A are broken out and displayed in isolation;

FIG. 5 is a block diagram showing functional units of a file construction unit of the parameter setting device;

DESCRIPTION OF THE PREFERRED EMBODIMENTS

Preferred embodiments of a parameter setting device and a parameter setting method according to the present invention will be described in detail below with reference to the accompanying drawings.

Figure 1:
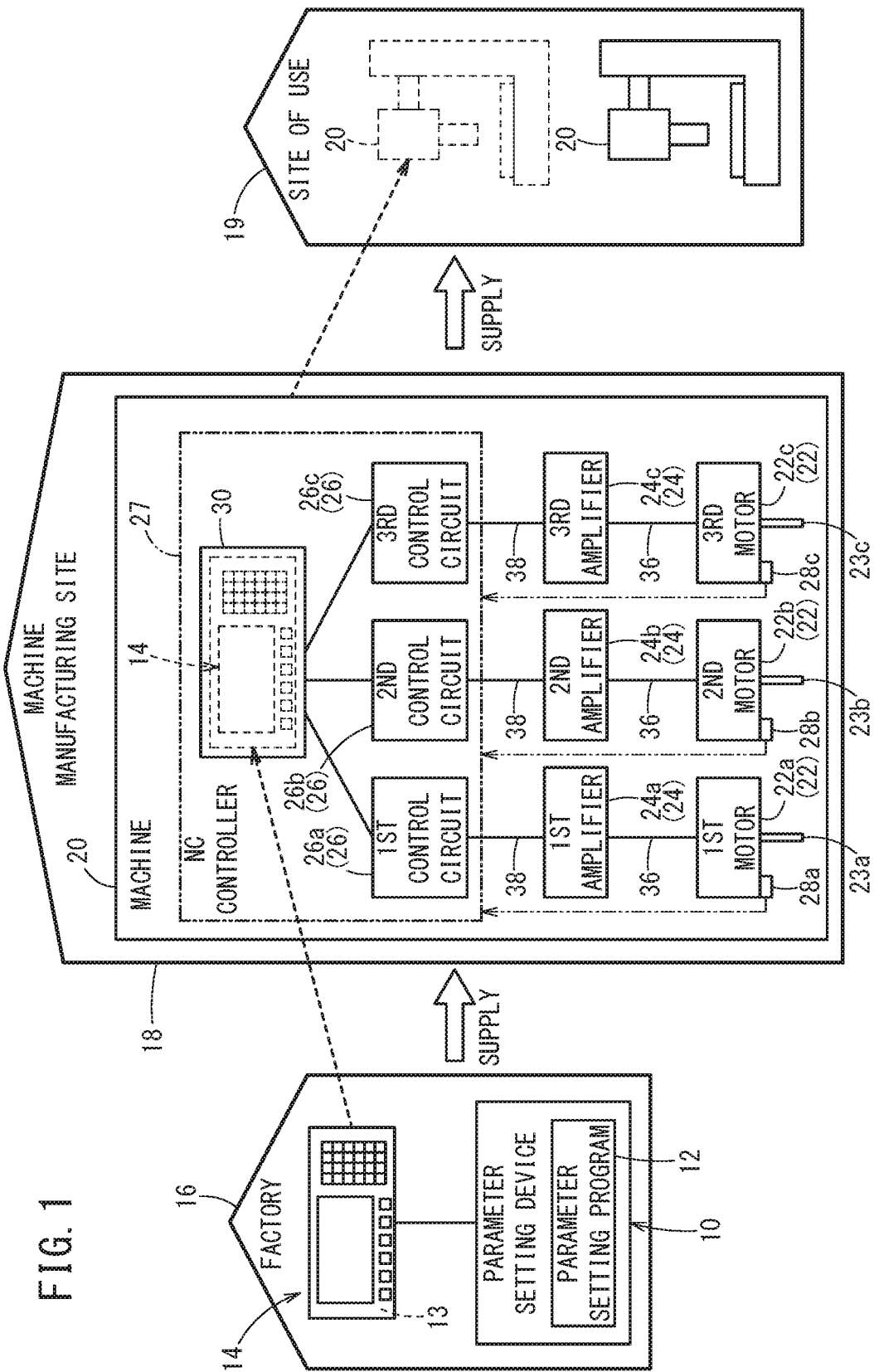
FIG. 1 is an explanatory diagram showing in outline an overall configuration of a parameter setting device, a numerical controller, and a machine according to an embodiment of the present invention.

As shown in FIG. 1, a parameter setting device 10 according to the present embodiment sets parameters for a numerical controller 14 by a parameter setting program 12 (hereinafter referred to simply as a program 12) provided in the interior thereof. As mentioned previously, the numerical controller 14 is supplied to a machine manufacturing site 18 of a manufacturer or the like from a factory 16 that manufactures such devices, and is incorporated into a machine 20 by a manufacturing operator at the machine manufacturing site 18. Furthermore, the machine 20 in which the numerical controller 14 is incorporated is shipped to a site of use 19 where workpieces are machined. The parameter setting device 10 performs information exchange with the numerical controller 14 by means of an information transmission device such as a network connection or an external memory (not shown), for example, and sets parameters for driving the machine, before providing the numerical controller 14, or at a time of incorporating the numerical controller 14 in the machine 20.

In this instance, the phrase "parameters for driving the machine" in the present specification refers to variables by which a mechanical configuration and an electrical configuration of the machine 20 are described. The parameters for driving the machine 20 are continuously maintained after being initially set at the time of incorporation of the numerical controller 14 therein. Accordingly, such parameters differ from machining parameters by which machining content is described in accordance with a machining program at a time of machining workpieces. Hereinafter, the parameters for driving the machine 20 will be referred to simply as parameters for convenience of explanation. Depending on the configuration of the machine 20, the parameters are set for driving the machine 20 within an appropriate operating range or with certain operating conditions, and may differ depending on the model of the numerical controller 14.

As examples of the machine 20 in which the numerical controller 14 is incorporated, there may be cited a machine tool or an industrial robot having a plurality of axes. Of course, the machine 20 to which the numerical controller 14 is applied is not limited in any particular way, and by effecting appropriate modifications thereto, the numerical controller 14 can be applied to a multi-function machine, the entire production line of a factory, or a consumer robot or the like.

Hereinafter, for facilitating understanding of the invention, first, a description will be briefly presented concerning the machine 20, which is manufactured at a machine manufacturing site 18 and is installed in a site of use 19, and one exemplary configuration of the numerical controller 14 that is incorporated in the machine 20.

The machine 20 is constituted as a multi-axis robot or a machine tool having a table for positioning a workpiece and operating units that carry out machining on the workpiece, and by linking a plurality of axes (according to the present embodiment, three orthogonal axes made up from an X-axis, a Y-axis, and a Z-axis), operations are performed for the machine 20 as a whole. However, the number of axes possessed by the machine 20 is not particularly limited, and the machine 20 may have one or more axes.

As shown in FIG. 1, the machine 20 is equipped with first through third motors 22a to 22c (a plurality of motors 22) for driving the table or operating units along the X-axis through the Z-axis, first through third amplifiers 24a to 24c (a plurality of amplifiers 24) connected to the first through third motors 22a to 22c, and first through third control circuits 26a to 26c (a plurality of control circuits 26) which output control signals to the first through third amplifiers 24a to 24c. Further, first through third detectors 28a to 28c are provided respectively in the first through third motors 22a to 22c.

Concerning the first through third motors 22a to 22c, there are applied, for example, servo motors for use with feed shafts, or spindle motors for use with spindles for machining a workpiece or the like. The first through third motors 22a to 22c serve to rotate movable shafts 23a to 23c in accordance with drive signals that are output from the first through third amplifiers 24a to 24c. Further, when rotated, the first through third motors 22a to 22c control the rotational positions, rotational velocity, or torque, etc., of the movable shafts 23a to 23c. The movable shafts 23a to 23c are connected to a non-illustrated gear mechanism, a ball screw, or the like, and drive the table or the operating units along the X-axis through the Z-axis.

Power amplifiers may be applied, for example, to the first through third amplifiers 24a to 24c, and on the basis of control commands output from the first through third control circuits 26a to 26c, the first through third amplifiers 24a to 24c generate drive signals and output the drive signals to the first through third motors 22a to 22c. Moreover, the numerical controller 14 and the machine 20 may be configured to output drive signals from a single amplifier with respect to a plurality of motors.

The first through third control circuits 26a to 26c are connected to the first through third amplifiers 24a to 24c through predetermined wirings within the machine 20, together with being connected so as to enable communication of information with the numerical controller 14. In the machine 20, an NC controller 27 is constituted by the first through third control circuits 26a to 26c and the numerical controller 14.

Position detectors such as encoders or speed detectors are applied to the first through third detectors 28a to 28c, and the first through third detectors 28a to 28c detect the driving states (position and speed) of the movable shafts 23a to 23c. Further, the first through third detectors 28a to 28c include non-illustrated feedback circuits therein, which output (feedback) the detected position information and speed information to the numerical controller 14 and the first through third amplifiers 24a to 24c. Apart from the first through third detectors 28a to 28c, the machine 20 may include various detectors for detecting the state of the machine tool and the state of the workpiece, and may be configured to transmit detection signals from the respective detectors to the numerical controller 14.

The machine 20 which is constituted as described above includes a placement section 30 in which the numerical controller 14 can be incorporated. When supplied from the factory 16 of a supply source, the numerical controller 14 is installed in the placement section 30 by an operator at the machine manufacturing site 18 and wirings are applied thereto, whereby the numerical controller 14 is electrically connected to the first through third control circuits 26a to 26c.

Concerning the numerical controller 14, a computer can be applied which is constituted from an input/output interface, a processor, and a memory, etc., which are not shown in the drawings. To the input/output interface of the numerical controller 14, there is connected an operating unit by which an operator performs operations, and a display unit that displays processing content of the operating unit and the processor. By a machine operator at the site of use 19, and by being input through the operating unit or taken in from CAD data or the like, a non-illustrated machining program (NC program) is stored in the memory of the numerical controller 14.

The operating system of the numerical controller 14 recognizes the positions and velocities of the first through third motors 22a to 22c on a time axis, on the basis of the machining parameters of the set machining program. In addition, when machining a workpiece, the operating commands for the first through third motors 22a to 22c are transmitted at an appropriate timing respectively to the first through third control circuits 26a to 26c, whereby the first through third motors 22a to 22c are driven to carry out machining of the workpiece.

Next, a description will be given concerning the parameter setting device 10 which sets parameters for driving the above-described machine 20. Concerning the parameter setting device 10, there can be applied a computer (including a desktop computer, a laptop computer, an information communications device such as a smart phone, a tablet, or the like) constituted from an input/output interface, a processor, and a memory, etc., which are not shown in the drawings.

Figure 2:
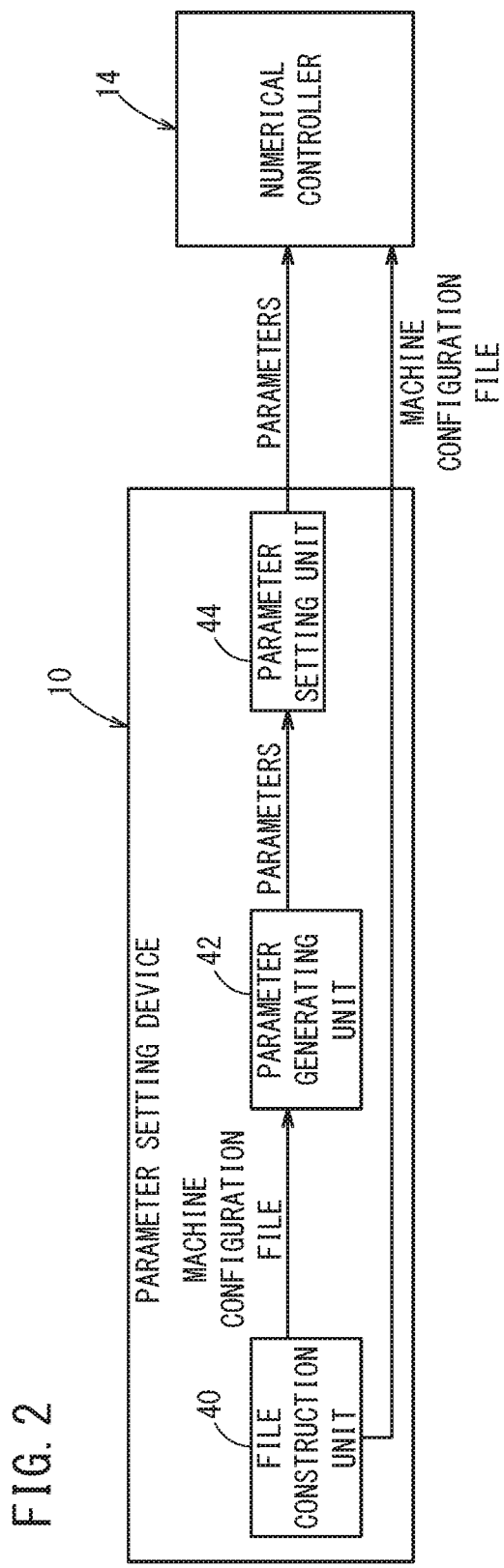
FIG. 2 is a functional block diagram at a time that parameters are generated in the parameter setting device of FIG. 1.

The aforementioned program 12 is stored in the memory of the parameter setting device 10. By the processor of the parameter setting device 10 executing the program 12, a file construction unit 40 (file construction means), a parameter generating unit 42 (parameter generating means), and a parameter setting unit 44 (parameter setting means) shown in FIG. 2 are formed.

The file construction unit 40 constructs a machine configuration file 46 (see FIG. 3A) that serves as an information source when setting the parameters. The "machine configuration file 46" can be referred to as a data group that is capable of generating parameters by suitably selecting and integrating various information (source information 48) which is input, selected, or read in by the operator. For example, as shown in FIG. 3A, in the machine configuration file 46, there are included information of the motors and the amplifiers with which the machine 20 is normally equipped, together with information concerning wire connections within the machine 20.

Further, the machine configuration file 46 preferably is generated without regard to the model of the numerical controller 14, or in other words, is generated in accordance with a common format corresponding to all models of the numerical controller 14 that are handled by the factory 16. For example, in the case that the numerical controller 14 includes new functions due to new developments, specification changes, or the like, the machine configuration file 46 may be updated to a common format with such functions added thereto.

Further, as an example of the source information 48 used for generating the aforementioned machine configuration file 46, there may be cited order information 50, connection information 52, and machine information 54.

The order information 50 corresponds to specification information of the numerical controller 14 requested by the manufacturer, and the information group includes the model of the numerical controller 14, option functions, the types and number of the motors 22, and the types and number of the amplifiers 24, etc. Concerning the models, in the order information 50 shown in FIG. 3A, there are included basic functions, FORM/SRAM, package, the number of control paths, the number of controlled axes, the number of spindle axes, the number of machine groups, a synchronous control, etc. Further, the option functions are added selectively to the numerical controller 14 and the machine 20 (neither of which is shown in FIG. 3A), according to a request from the side of the machine manufacturing site 18. As examples of the option functions, there may be cited control functions corresponding to 3D processing, an avoidance function to avoid interference between the machine tools themselves or interference between the machine tools and people, and a power shutdown function to safely shut down the power supply in the case of a power outage, etc. Furthermore, the types and number of the motors 22 include the number of servo motors, and the motor models within the order information 50 shown in FIG. 3A. Similarly, the types and number of the amplifiers 24 include the number of amplifiers, and the amplifier models (not shown in FIG. 3A).

On the other hand, the connection information 52 corresponds to information of wirings that electrically connect the constituent elements provided in the machine 20. For example, in the machine 20 shown in FIG. 1, in the connection information 52, there are included connections 36 between the first through third motors 22a to 22c and the first through third amplifiers 24a to 24c, and connections 38 between the first through third amplifiers 24a to 24c and the first through third control circuits 26a to 26c. In the connection information 52 shown in FIG. 3A, which of the first through third control circuits 26a to 26c is connected to which of the first through third motors 22a to 22c (and the first through third amplifiers 24a to 24c) is indicated as servo bus slave.

Furthermore, the machine information 54 corresponds to the specification information of the machine 20 in which the numerical controller 14 is incorporated, and for example, includes information concerning the names of axes of the machine 20, external detectors, and the units of motion of the machine 20 (refer to the machine information 54 shown in FIG. 3A). Further, the machine information 54 may include information concerning a ball screw (ball screw pitch, etc.) as specific information of the axes of the machine 20.

The machine configuration file 46 is constituted so as to include the order information 50, the connection information 52, and the machine information 54 that are input, selected or read in with respect to the file construction unit 40. Moreover, the machine configuration file 46 preferably is configured as a database in which a plurality of items are grouped together for each path, so as to facilitate retrieval and extraction of information. As examples of such items, there may be cited items such as "System Configuration", "Axes", "Motor and Amplifier Types", "Servo Bus Connections", and the like.

In this case, in the items of the "System Configuration", there are included a series that is set from the basic function of the order information 50, the number of paths that is set from the number of control paths of the order information 50, the number of controlled axes that is set from the number of controlled axes of the order information 50, the number of spindle axes that is set from the number of spindle axes of the order information 50, and axis names that are set from the axis names of the machine information 54. Further, in the items of the "Axes", there are included units of motion that are set from the units of motion of the machine information 54. Furthermore, in the items of the "Motor and Amplifier Types", information (types and numbers) of the motors 22 are set from the motor models of the order information 50, and information (types and numbers) of the amplifiers 24 are set from the amplifier models of the order information 50 (not shown). In the items of the "Servo Bus Connections", there is included information of the connections 36 and 38 of the first through third control circuits 26a to 26c and the X-axis, the Y-axis, the Z-axis of the machine 20.

Further, as shown in FIG. 3B, as the parameters 56 for driving the machine 20, there may be cited parameter numbers 100 (numerical values following an initial letter N) allocated to each of the parameters 56, notation numbers 102 (Q1) indicating that they are the parameters 56 for driving the machine 20, path numbers indicating a path of the configuration of the machine 20 (numerical values following an initial letter L, see FIG. 3A), controlled axis numbers 104 for the machine 20 (numerical values following an initial letter A), and set values 106 for the parameters 56 (numerical values following an initial letter P). As shown in FIG. 3A, the numerical controller 14 reads in the path numbers, the controlled axis numbers 104, and the set values 106, etc., possessed by each of the parameter numbers 100 listed in order of the parameter numbers 100, whereby the machine configuration and the electrical configuration of the machine 20 are recognized.

Figure 4A:
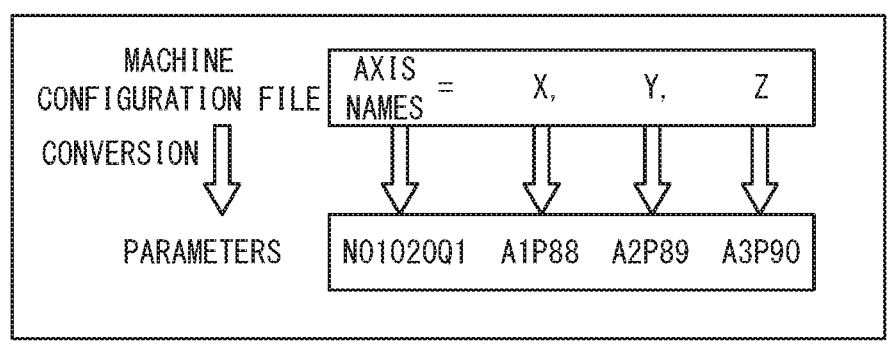
FIG. 4A is an explanatory diagram showing an example of converting from a machine configuration file into parameters.

As shown for example in FIG. 4A, in the case that the parameters 56 are generated from the machine configuration file 46, in an arbitrary parameter number N01020, the "axis names" X-axis, Y-axis, and Z-axis of the machine configuration file 46 are converted in the following manner: X-axis→A1, Y-axis→A2, Z-axis→A3. In the illustrated example, P88 is given as a set value for the X-axis (A1), P89 is given as a set value for the Y-axis (A2), and P90 is given as a set value for the Z-axis (A3).

Next, the detailed functional units and processing contents of the file construction unit 40, the parameter generating unit 42, and the parameter setting unit 44, which are formed by the program 12 of the parameter setting device 10, will be described. As shown in FIG. 5, the file construction unit 40 includes an information acquiring unit 60, a provisional file generating unit 62, a file editing unit 64 (file editing means), and a file generating unit 66.

The information acquiring unit 60 is a functional unit that acquires the above-described source information 48. For example, as patterns for acquiring the source information 48, the following methods (a) to (e) can be cited.

(a) The operator manually inputs information through the operating unit of the parameter setting device 10.

(b) The operator selects an appropriate sample from among samples of the machine configuration file 46.

(c) The parameters of a similar machine, which is similar to the numerical controller 14 or the machine 20 of the machine manufacturing site 18, are used.

(d) An already created machine configuration file 46 is used.

(e) Data of source information 48 possessed by the operator are read in.

In order to implement the aforementioned method (a), the information acquiring unit 60 includes an information input unit 68. The information input unit 68 causes a display unit of the parameter setting device 10 to display an input screen, and stores the source information 48 input by the operator via the operating unit in a data area of a memory for use by the information input unit 68.

In order to implement the aforementioned method (b), the information acquiring unit 60 includes a file selection unit 70 (sample selection unit). The file selection unit 70 includes, in a data area 71 of a memory for use by the file selection unit 70, one or more machine configuration file samples 70a (in other words, source information 48 that are grouped together) of typical machines 20. In addition, the file selection unit 70 causes the display unit to display a selection screen, which allows the operator to select a machine configuration file sample 70a via the operating unit.

In order to implement the aforementioned method (c), the information acquiring unit 60 includes a parameter reading unit 72. The parameter reading unit 72 causes the display unit to display a guidance screen that prompts the operator to perform an operation for reading in parameters, and further, when reading in parameters of a similar machine prepared by the operator in an external memory or the like, the parameter reading unit 72 stores the parameters in a data area of a memory for use by the parameter reading unit 72. Moreover, the term "similar machine" implies that at least one from among a model, a model number, or a series coincides with the numerical controller 14 in which the parameters are set.

In order to implement the aforementioned method (d), the information acquiring unit 60 includes a file reading unit 74 (file acquisition unit). The file reading unit 74 causes the display unit to display a guidance screen that prompts the operator to perform an operation for reading in a generated machine configuration file 46. Further, when reading in the generated machine configuration file 46 prepared by the operator in an external memory or the like, the file reading unit 74 stores the machine configuration file 46 in a data area of a memory for use by the file reading unit 74.

In order to implement the aforementioned method (e), the information acquiring unit 60 includes an information reading unit 76. The information reading unit 76 causes the display unit to display a guidance screen that prompts the operator to perform an operation for reading in information, and further, when reading in the source information 48 prepared by the operator in an external memory or the like, the information reading unit 76 stores the information in a data area of a memory for use by the information reading unit 76.

The information acquiring unit 60 allows the operator to select which one of the aforementioned methods (a) to (e) to use for supplying information to the device when the parameter setting device 10 undertakes a parameter setting operation, and in accordance with the selection, causes a corresponding internal functional unit to execute processes.

Further, the provisional file generating unit 62 of the file construction unit 40 automatically generates a provisional machine configuration file, based on the source information 48 acquired by the information acquiring unit 60. The provisional machine configuration file includes items similar to those of the machine configuration file 46 (refer also to FIG. 3A), and is made up from information that can be edited in the file editing unit 64.

The provisional file generating unit 62 includes an inverse conversion unit 78 (inverse conversion means), which generates the machine configuration file 46 from the parameters 56 (in other words, this process flow is opposite to the process flow of generating the parameters 56 from the machine configuration file 46) in the event that the source information 48 is input by the above method (c). The inverse conversion unit 78 includes an inverse conversion table 78a in a data area of a memory for use by the inverse conversion unit 78, and when the parameters 56 are obtained from the parameter reading unit 72, the provisional machine configuration file is generated with reference to the inverse conversion table 78a.

Figure 4B:
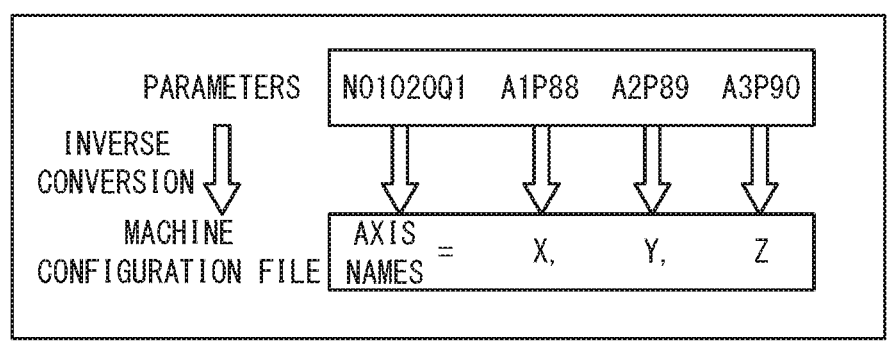
FIG. 4B is an explanatory diagram showing an example of inversely converting from parameters into a machine configuration file.

For example, as shown in FIG. 4B, when generating the machine configuration file 46 from the parameters 56, the inverse conversion unit 78 identifies items pertaining to information of the motors of the machine configuration file 46 from the parameter numbers 100 and/or the path numbers (see FIG. 3A) of the parameters 56. Further, the inverse conversion unit 78 identifies a situation that A1, A2, and A3 in the controlled axis numbers 104 refer respectively to the X-axis, the Y-axis, and the Z-axis, and generates a provisional machine configuration file.

Returning to FIG. 5, the provisional file generating unit 62 may include a file supplementing unit 85 (refer to the two-dot dashed line in FIG. 5), which has the same function as a later-described file supplementing unit 84. In the event there is an insufficiency in the acquired source information 48, the file supplementing unit 85 automatically adds information in order to make up for the insufficiency of information.

Further, the file editing unit 64, which is provided on a downstream side from the provisional file generating unit 62, is a functional unit that enables the operator to edit the generated provisional machine configuration file, and includes an editing operation unit 80 and a file checking unit 82. The editing operation unit 80 displays a screen for inputting information, and overwrites the provisional machine configuration file with corrected content or content to be added to or deleted from the provisional machine configuration file, such content being input by the operator via the operating unit. The file checking unit 82 reads out the provisional machine configuration file that is stored in the memory, and determines whether the provisional machine configuration file is logically correct or not, or whether it is capable of physically operating the machine 20 or not. The file editing unit 64 need not necessarily be provided. For example, editing of the machine configuration file 46 may be carried out on the side of the numerical controller 14.

By editing the provisional machine configuration file by the above-described file editing unit 64, or alternatively, by using the provisional machine configuration file without modification, in the case that editing is not necessary, the file construction unit 40 generates the machine configuration file 46 shown in FIG. 3A.

Further, when the source information 48 is read in from the information reading unit 76, the file generating unit 66 of the file construction unit 40 generates the machine configuration file 46 on the basis of the source information 48, without going through the step of generating the provisional machine configuration file. The file generating unit 66 includes a file supplementing unit 84 (file supplementing means) that generates the machine configuration file 46 by supplementing the source information 48, in the case that a portion of the source information 48 is insufficient.

The file supplementing unit 84 stores in a predetermined data area of the memory a supplementary table 84a including the order information 50, the connection information 52, and the machine information 54. For example, the supplementary table 84a is able to use, as big data, information of the numerical controller 14 and the machine 20, orders of which were received formerly by the factory 16. With reference to the source information 48 which was read in, the file supplementing unit 84 estimates supplemental content for which there is no logical inconsistency from within the stored supplementary table 84a, and adds information automatically in order to make up for the insufficiency of information.

Consequently, following completion of the process of the file supplementing unit 84, the machine configuration file 46 can be constructed without the intervention of the file editing unit 64. Further, as shown by the dashed line in FIG. 5, the file construction unit 40 may be configured to generate the machine configuration file 46 through the file editing unit 64, on a downstream side of the file supplementing unit 84.

Figure 6:
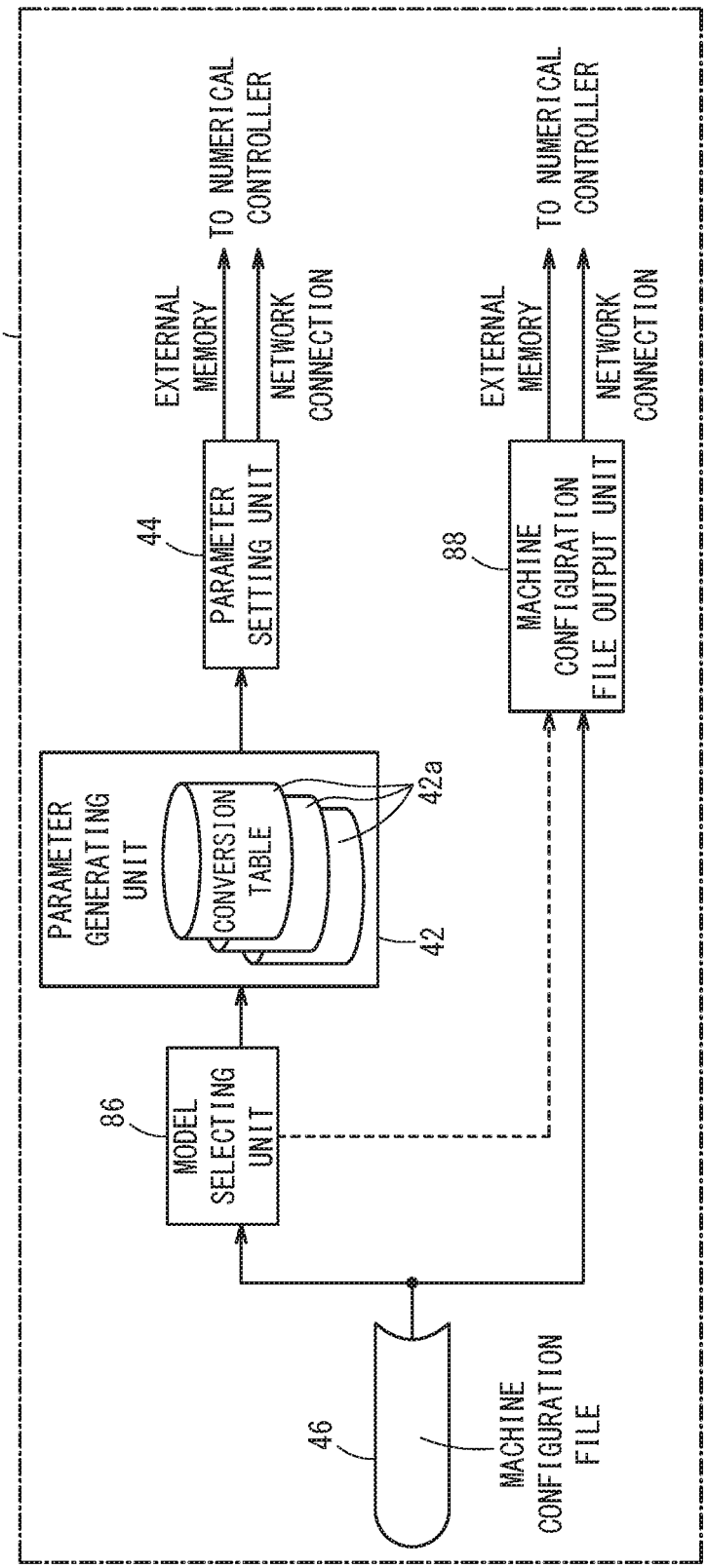
FIG. 6 is a block diagram showing a parameter generating unit and a parameter setting unit of the parameter setting device.

After the machine configuration file 46 is constructed by the file construction unit 40, as shown in FIG. 6, the parameter setting device 10 generates the parameters 56 from the machine configuration file 46 using the parameter generating unit 42, and sets the parameters 56 in the numerical controller 14 using the parameter setting unit 44. Moreover, a model selecting unit 86 is provided which selects a model of the numerical controller 14 prior to generation of the parameters 56.

The model selecting unit 86 allows the operator to select a numerical controller 14 in which the machine configuration file 46 is actually used, or stated otherwise, in which the parameters 56 are set. For example, the model selecting unit 86 causes the display unit to display a selection screen, which allows the operator to select a model via the operating unit. Moreover, the model selecting unit 86 may also be configured to automatically select the model of the numerical controller 14 from model information included within the machine configuration file 46.

When a model of the numerical controller 14 is selected, corresponding to that model, the parameter generating unit 42 generates the parameters 56 from the machine configuration file 46. The parameter generating unit 42 includes conversion tables 42a for each of the models in a data area of the memory for use by the parameter generating unit 42, and reads out one of such conversion tables 42a based on the selected model. In addition, with reference to the read out conversion table 42a, the parameter generating unit 42 generates the parameters 56 from the machine configuration file 46.

The parameter setting unit 44 operates an input/output interface of the parameter setting device 10, and outputs the parameters 56 to the exterior of the parameter setting device 10. For example, a method may be adopted in which, upon setting of the parameters 56, the parameters 56 are stored in an external memory (a storage medium such as a CD-ROM, an HDD, or the like), and by connecting the external memory to the numerical controller 14, the parameters 56 are stored in the numerical controller 14. Alternatively, a method may be adopted in which the parameter setting device 10 and the numerical controller 14 are network connected wirelessly or over wires, whereby the numerical controller 14 stores the parameters 56.

Further, a method may be adopted in which, with this system, by supplying the machine configuration file 46 to the numerical controller 14, the parameters 56 can be generated and set on the side of the numerical controller 14. Therefore, as shown in FIG. 6, the parameter setting device 10 includes a machine configuration file output unit 88 (output unit), which operates the input/output interface of the parameter setting device 10, and outputs to the exterior the machine configuration file 46 which is constructed by the file construction unit 40. The machine configuration file output unit 88, similar to the parameter setting unit 44, may adopt a method in which the machine configuration file 46 is stored in the numerical controller 14 by way of an external memory or a network connection. Moreover, prior to the machine configuration file 46 being output to the exterior, the parameter setting device 10 may select a model of the numerical controller 14 through the model selecting unit 86 (refer to the dashed line in FIG. 6), and may change the information of the machine configuration file 46 output by the machine configuration file output unit 88, depending on the model.

Figure 7:
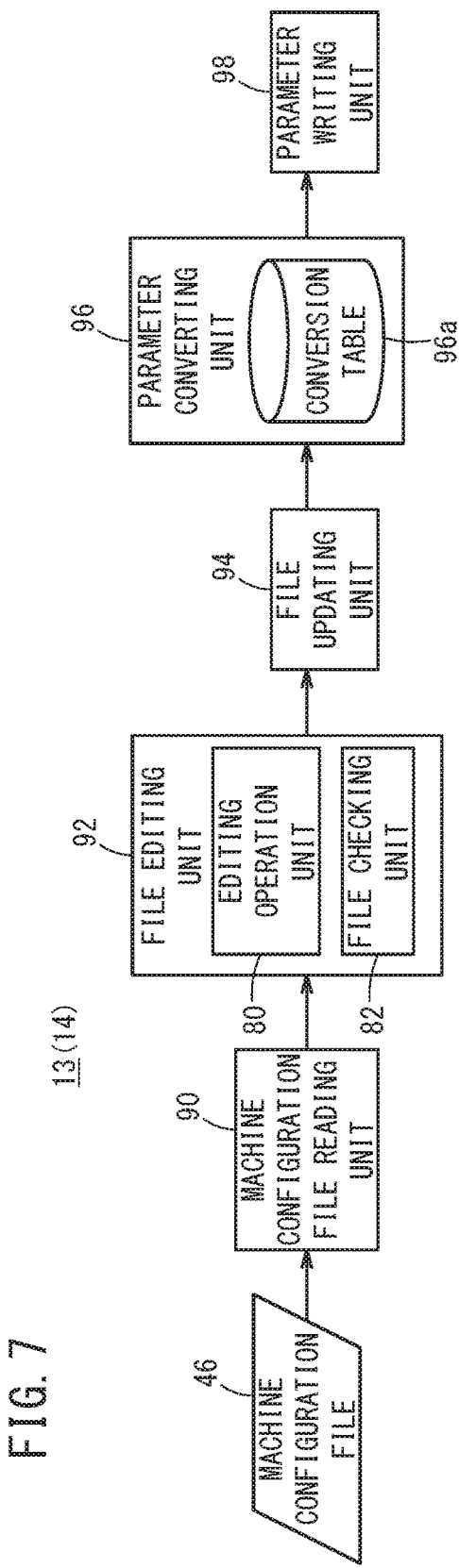
FIG. 7 is a block diagram showing functional units for cases of creating and setting parameters with a numerical control side setting program.

On the other hand, in the case that the numerical controller 14 carries out generation and setting of the parameters 56 from the machine configuration file 46, a processor of the numerical controller 14 executes a numerical control side setting program 13 (parameter setting program) stored in the memory, and thereby constructs functional units, as shown in FIG. 7. More specifically, within the numerical controller 14, there are formed a machine configuration file reading unit 90, a file editing unit 92 (file editing means), a file updating unit 94, a parameter converting unit 96 (parameter generating unit), and a parameter writing unit 98 (parameter setting unit).

The machine configuration file reading unit 90 reads in the machine configuration file 46 provided by the external memory or the network connection, and stores the machine configuration file 46 as a provisional machine configuration file in a data area of the memory for use by the machine configuration file reading unit 90. The file editing unit 92, similar to the file editing unit 64 of the parameter setting device 10, includes an editing operation unit 80 and a file checking unit 82, and edits and checks the provisional machine configuration file on the side of the numerical controller 14. The file updating unit 94 updates the stored machine configuration file 46 with the machine configuration file 46 that was edited by the file editing unit 92. It should be noted that the numerical controller 14 need not necessarily be equipped with the file editing unit 92 and the file updating unit 94.

On the other hand, the parameter converting unit 96 of the numerical controller 14 includes a conversion table 96a corresponding to the functions and model of the numerical controller 14. With reference to the conversion table 96a, the parameter converting unit 96 converts the machine configuration file 46 that was updated by the file updating unit 94 (or the machine configuration file 46 that was read in by the machine configuration file reading unit 90, without modification) into the parameters 56 of the numerical controller 14. Further, the parameter writing unit 98 sets the parameters 56 by directly writing the parameters 56 that were generated by the parameter converting unit 96 into an appropriate data area of the numerical controller 14.

Further, as shown in FIGS. 5 and 6, the parameter setting device 10 may be equipped with an automatic generation setting unit 99 (automatic setting unit), which simply by acquiring the source information 48, automatically sets the parameters 56 or registers the machine configuration file 46 in the numerical controller 14. In accordance with this feature, for example, it is possible to swiftly and continuously generate and set the parameters 56, in the event that a large number of numerical controllers 14 are manufactured in the factory 16 or the like.

For example, the automatic generation setting unit 99 can be realized by the respective functional units that are surrounded by the one-dot-dashed lines in FIGS. 5 and 6. More specifically, by sequentially operating the information reading unit 76 and the file generating unit 66, the file construction unit 40 automatically generates the machine configuration file 46 after having read the source information 48. In addition, the model selecting unit 86 automatically selects the numerical controller 14 based on the model information contained within the file. Furthermore, the parameter generating unit 42 automatically generates the parameters 56 on the basis of the selected model, and the parameter setting unit 44 automatically sets the generated parameters 56 in the numerical controller 14. Consequently, it is possible to set the parameters 56 in the numerical controller 14 without imposing an undue amount of labor on a factory worker in the factory 16.

The parameter setting device 10 and the program 12 according to the present embodiment are configured basically in the manner described above. Next, a description will be presented below concerning a process flow (parameter setting method) at a time of generating the parameters 56.

When operated, the parameter setting device 10 (program 12) forms functional units, as shown in FIG. 2, which sequentially carry out a construction step of acquiring or generating the machine configuration file 46 by the file construction unit 40, a parameter generating step of generating, by the parameter generating unit 42, the parameters 56 for driving the machine 20 on the basis of the machine configuration file 46, and a parameter setting step of setting the generated parameters 56 in the numerical controller 14 by the parameter setting unit 44.

Figure 8:
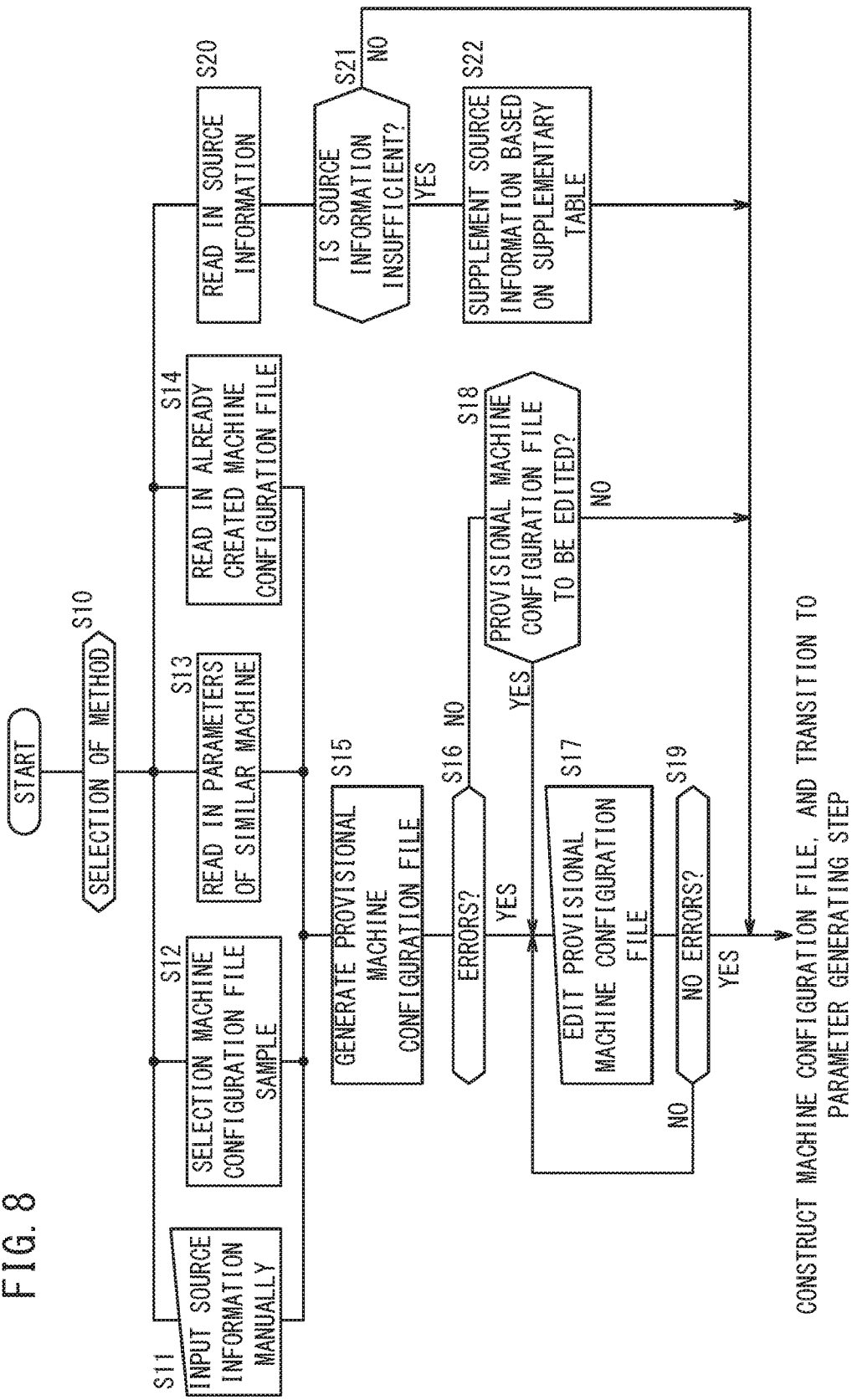
FIG. 8 is a first flowchart showing a process flow of a parameter setting method.

More specifically, in the construction step shown in FIG. 8, the information acquiring unit 60 of the parameter setting device 10 allows the operator to select the method of obtaining the source information 48 (step S10). For example, a screen which enables the operator to select a method from among the aforementioned methods (a) to (e)

is displayed on the display unit, and the operator is prompted to select one of such methods.

In addition, in the case that the method (a) is adopted, the information input unit 68 displays an input screen, in which the operator is allowed to input the order information 50, the connection information 52, and the machine information 54, which make up the source information 48 (step S11). In the case that the method (b) is adopted, the file selection unit 70 displays a selection screen, and a machine configuration file sample 70a, which forms the basis of the machine configuration file 46, is selected (step S12). In the case that the method (c) is adopted, the parameter reading unit 72 displays a guidance screen, and the parameters 56 of a similar machine possessed by the operator are read in (step S13). In the case that the method (d) is adopted, the file reading unit 74 displays a guidance screen, and an already created machine configuration file 46 possessed by the operator is read in (step S14).

Further, in the case that any one of steps S11 to S14 is executed, the provisional file generating unit 62 generates a provisional machine configuration file from the acquired source information 48 (step S15). Moreover, when the provisional machine configuration file is generated, in the case that the parameters 56 of a similar machine were read in accordance with the aforementioned method (c), the parameters 56, which are read into the inverse conversion unit 78, are converted according to the inverse conversion table 78a, and the provisional machine configuration file is created.

Next, the file checking unit 82 of the file editing unit 64 determines whether there is a logical error in the generated provisional machine configuration file (step S16), and if such a logical error exists, editing of the provisional machine configuration file is performed by the operator (step S17). On the other hand, if no errors are found in the provisional machine configuration file, a selection is made as to whether or not to edit the provisional machine configuration file (step S18), and if such editing is to be performed, the process proceeds to step S17, whereas if editing is not performed, the provisional machine configuration file is set as the machine configuration file 46.

In the event that step S17 was executed, checking of the edited provisional machine configuration file is carried out once again by the file checking unit 82 (step S19), and if any error is found therein, the process returns to step S17 in order to correct the error location. If no errors are discovered, the edited provisional machine configuration file is set as the machine configuration file 46.

On the other hand, in the case that the method (e) is adopted, the information reading unit 76 displays a guidance screen, and the source information 48 possessed by the operator is read in (step S20). Thereafter, the file supplementing unit 84 determines whether the source information 48 that was read in is insufficient or satisfactory (step S21). If the contents of the source information 48 are insufficient, the process proceeds to step S22. In step S22, on the basis of the supplementary table 84a, the file supplementing unit 84 fills in the information of the insufficient location, and then the file generating unit 66 generates the machine configuration file 46. Further, if there is no insufficiency in the contents of the source information 48, step S22 is skipped, and the machine configuration file 46 is generated.

Figure 9:
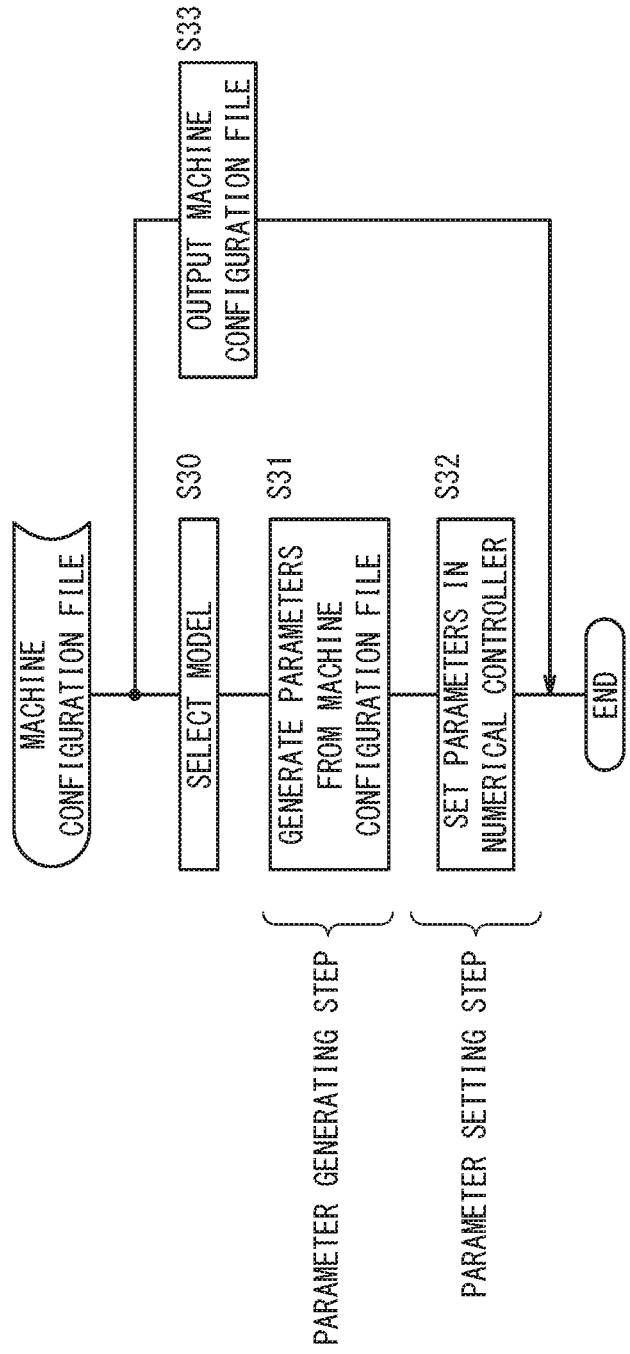
FIG. 9 is a second flowchart showing a process flow of the parameter setting method continuing from FIG. 8.

After completion of the above-described construction step, as shown in FIG. 9, the parameter setting device 10 executes the parameter generating step. In the parameter generating step, first, the model selecting unit 86 displays a selection screen, in which a model of the numerical controller 14 is selected by the operator (step S30). Next, in the parameter generating unit 42, in accordance with a conversion table 42a corresponding to the selected model, or alternatively, in accordance with the logic incorporated in the program 12, the parameters 56 are generated from the machine configuration file 46 (step S31).

In addition, after the parameter generating step, the parameter setting step is executed. In the parameter setting step, the parameters 56 that were generated in the parameter generating unit 42 are stored in the numerical controller 14 by the parameter setting unit 44 through an external memory or a network connection (step S32).

Further, the parameter setting device 10 can also store the generated machine configuration file 46 in the numerical controller 14. In this case, the machine configuration file output unit 88 outputs the machine configuration file 46 through the external memory or the network connection (step S33), and registers the machine configuration file 46 in the numerical controller 14. On the side of the numerical controller 14, by the functional units shown in FIG. 7 sequentially performing processes therein, in the same manner as discussed above, the parameters 56 can be generated and set from the machine configuration file 46.

By carrying out the process flow described above, the parameter setting device 10 and the numerical controller 14 are capable of significantly reducing the amount of labor required of the operator when performing initial settings for the numerical controller 14. Below, in order to provide a deeper understanding of the effects of the present invention, a detailed example will be described with reference to FIG. 10, in which after performing inverse conversion from the parameters 56 into the machine configuration file 46, the parameters 56 are again generated from the machine configuration file 46.

For example, in step S13 of FIG. 8, the parameter reading unit 72 of the parameter setting device 10 reads in the parameters (hereinafter referred to as similar machine parameters 200) of a similar machine shown in FIG. 10. On the basis of reading in the similar machine parameters 200, the provisional file generating unit 62 generates the provisional machine configuration file 202 shown in FIG. 10. In this instance, assuming a case in which the similar machine uses millimeters as the units of motion of the linear axes thereof, the similar machine parameters 200 also are provided in the form of numerical values based on millimeter units. Thus, the provisional machine configuration file 202 generated by the provisional file generating unit 62 also is generated in units of millimeters.

Figure 10:
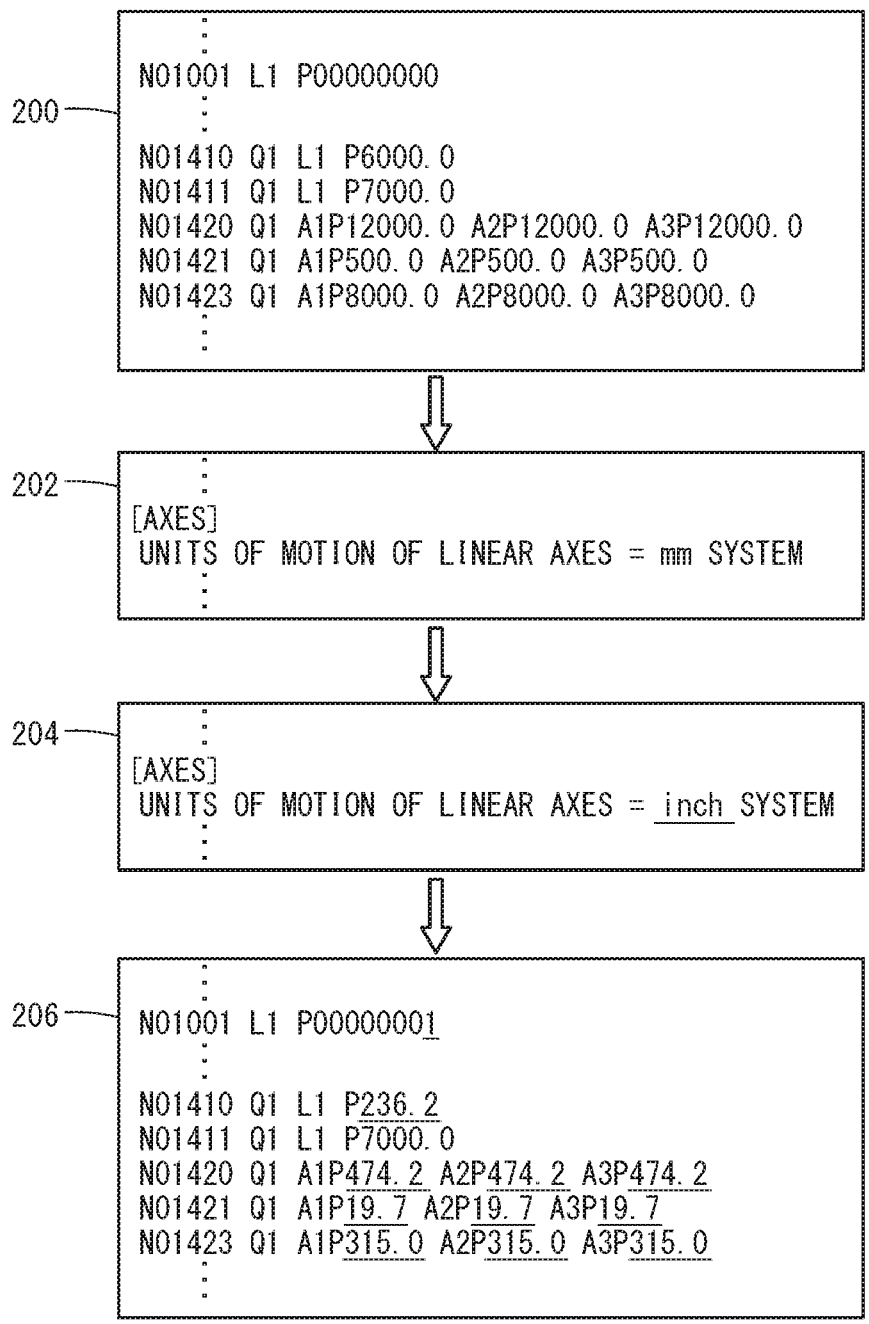
FIG. 10 is an explanatory diagram showing an example of information when a provisional machine configuration file is generated from parameters of a similar machine, a machine configuration file is constructed from the provisional machine configuration file, and furthermore, parameters are set from the machine configuration file.

In contrast thereto, assuming a case in which the current numerical controller 14 uses inches as the units of motion of the linear axes, the operator changes the units of motion of the linear axes [axes] of the provisional machine configuration file 202 into an inch-based system in the file editing unit 64 (refer to the machine configuration file 204 shown in FIG. 10). Consequently, the machine configuration file 204 that is constructed in the file construction unit 40 is capable of specifying the parameters 206 in units of inches.

Accordingly, as shown in FIG. 10, in the parameter generating unit 42, in the parameters 206 that are generated on the basis of the aforementioned machine configuration file 204, the set values 106 following the controlled axis numbers 104 are converted into units of inches. As can be understood from the illustrated example, in contrast to modifying one location of the provisional machine configuration file 202, a large amount of data are converted in relation to the parameters 206. More specifically, conventionally, the parameters have been changed one-by-one by an operator. However, through operation of the parameter setting device 10, it is possible to collectively set the parameters 206, and thereby significantly reduce the amount of labor required of the operator.

Figure 11:
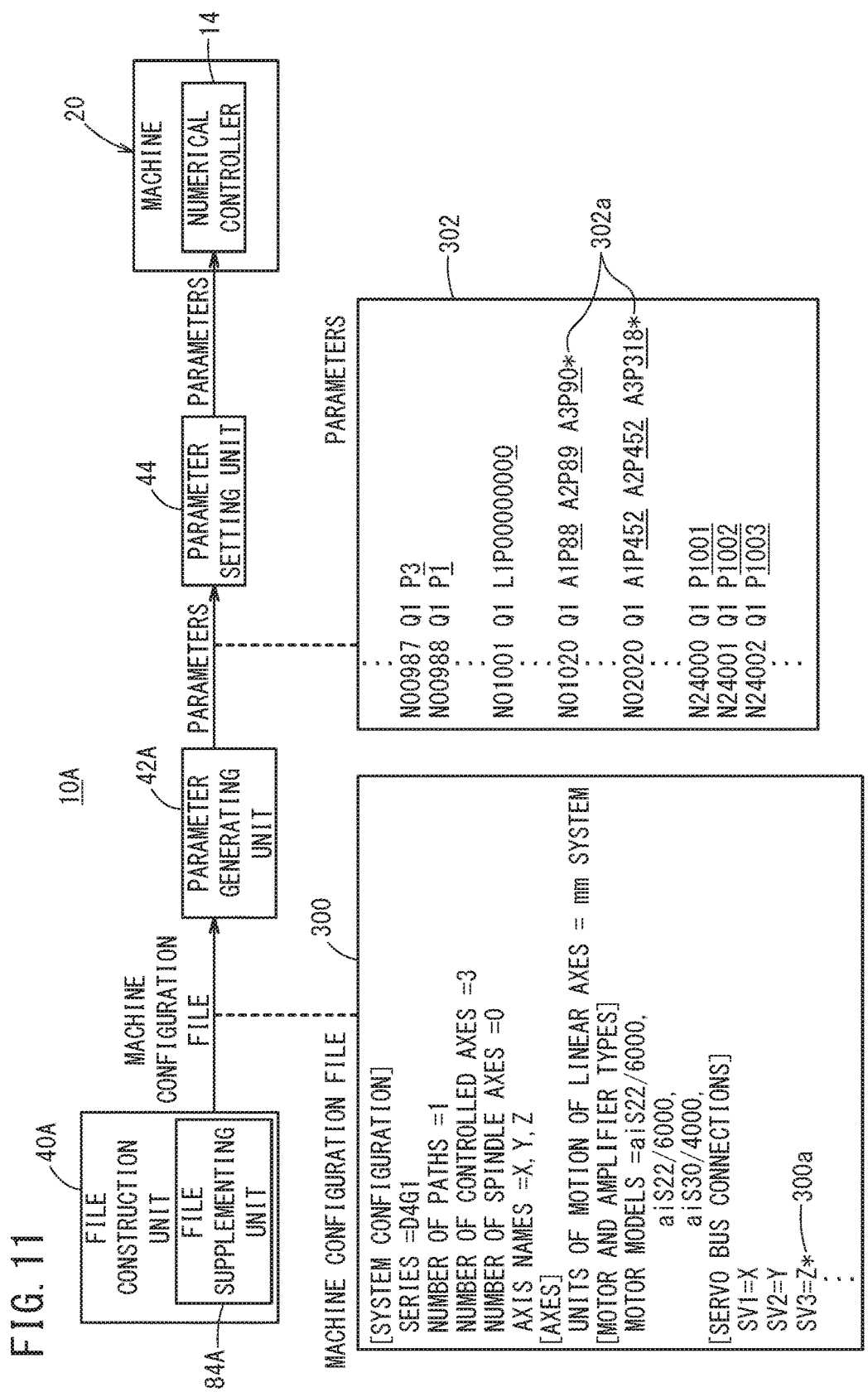
FIG. 11 is a block diagram showing respective configurations, a machine configuration file, and parameters of the parameter setting device according to an exemplary application.

It is a matter of course that the parameter setting device 10 can adopt various exemplary applications and modifications. For example, in the case that information exists requiring confirmation by the manufacturing operator, the parameter setting device 10A according to the exemplary application shown in FIG. 11 is configured to add information indicative of non-confirmation to the machine configuration file 300. More specifically, when automatically supplementing information from the supplementary table 84*a* (see FIG. 5) for filling up an insufficiency in the information, the file supplementing unit 84A of the file construction unit 40A generates the supplemental information, together with determining whether or not there is information requiring confirmation by the manufacturing operator, and in the case that confirmation is required, information indicative of non-confirmation is added thereto. For example, the information indicative of non-confirmation is added by way of a flag 300*a* (indicated by an asterisk * in the illustrated example) next to an item of the machine configuration file 300 for which confirmation is required.

If the flag 300*a* is included within the machine configuration file 300, the parameter generating unit 42A generates the parameters 302 so as to include parameters therein (parameter flags 302*a*: indicated by asterisks * in the illustrated example) indicative of non-confirmation in the parameter numbers related to the item. Consequently, the parameter setting unit 44 sets the parameters 302 including the parameter flags 302*a* in the numerical controller 14.

In addition, the numerical controller 14 is configured so as not to drive the machine 20, in the case that the parameter flags 302*a* are recognized within the parameters 302. More specifically, in the case that an item that requires confirmation in order to conform to the condition of the machine (for example, connection information, or machine information such as the pitch of a ball screw, etc.) is incorrect, if the machine 20 were to drive the motors 22, there is a possibility of causing a malfunction such as a breakdown or the like. Therefore, by not driving the machine 20 based on the parameter flags 302*a*, the numerical controller 14 can avoid malfunctioning of the machine 20. Moreover, in the case that a manufacturing operator determines that the parameter flags 302*a* are normal and performs an operation after confirmation thereof, the numerical controller 14 cancels the parameter flags 302*a*, and makes it possible for the machine 20 to be driven.

In the foregoing manner, in the parameter setting device 10, the parameter setting program 12, and the parameter setting method according to the present embodiment, the machine configuration file 46, in which information is described pertaining to the configuration of the machine 20, can easily be converted into the parameters 56 for driving the machine 20, with a minimum of manual labor by the operator. Therefore, it is possible to significantly reduce the amount of labor required for the operator to set the parameters 56 at the machine manufacturing site 18, and ease of use of the numerical controller 14 can further be enhanced.

In this case, by including in the machine configuration file 46 the information of the motors 22, the information of the amplifiers 24, and the information of the connections, the parameter setting device 10 can generate the parameters 56 for driving the machine 20 with logically correct contents. Further, for example, although there is a possibility that the machine configuration file 46 cannot be made, due to wire connections of an amplifier 24 not having been decided at a stage of shipment from the factory 16 or the like, by the file supplementing unit 84 supplementing the insufficient portion as a general machine configuration, it is possible to eliminate an inconvenience in which the machine configuration file 46 cannot be created so that the machine configuration file 46 cannot be used for setting of the parameters 56. Furthermore, even if the model of the numerical controller 14 is different, based on the inversely converted machine configuration file 46, the inverse conversion unit 78 can generate and set the parameters 56 of the different model, and versatility thereof can further be enhanced.

The present invention is not limited to the embodiments described above, and it goes without saying that various modified or additional configurations could be adopted therein without departing from the essential scope and gist of the present invention.

Figure 12:
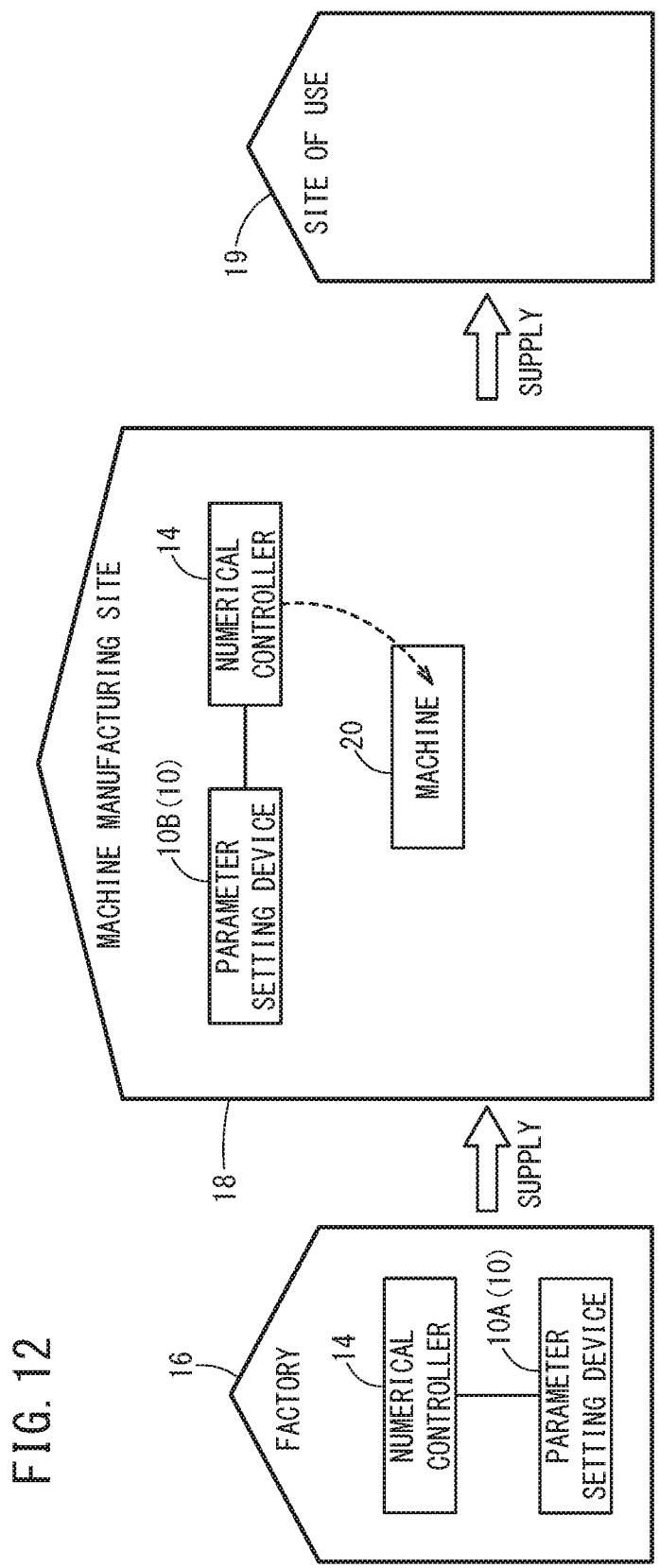
FIG. 12 is a block diagram showing conditions under use of the parameter setting device according to another exemplary application.

For example, the parameter setting device 10 need not be provided only in the factory 16, but may also be provided in various other locations (sites). For example, as shown in FIG. 12, the parameter setting device 10 may be installed in a machine manufacturing site 18, and may include a configuration to enable setting of the parameters 56 with respect a numerical controller 14 in the machine manufacturing site 18. In accordance with this feature, the operator can generate and set the parameters 56 using the parameter setting device 10 at an arbitrary timing, before or during manufacturing of the machine 20 at the machine manufacturing site 18. Further, in this case, a method of use can be adopted in which the machine configuration file 46 is generated by the parameter setting device 10A in the factory 16 and supplied to the machine manufacturing site 18, the generated machine configuration file 46 (previously created machine configuration file) can be read in by the parameter setting device 10B in the machine manufacturing site 18, and the manufacturing worker can carry out editing thereof so as to generate the parameters 56.

Further, for example, in the above-described embodiment, although a description has been given in which the parameter setting device 10, the numerical controller 14, and the machine 20 are described respectively as independent systems, a configuration may be provided as an integrated system in which the parameter setting device 10, the numerical controller 14, and the machine 20 are integrated mutually depending on design thereof. More specifically, the parameter setting program 12 may be disposed in the numerical controller 14, or stated otherwise, the parameter setting device 10 and the numerical controller 14 may be integrated. Further, the system may be configured in such a manner that the numerical controller 14 and the machine 20 are integrated, the parameter setting device 10 and the machine 20 are integrated, or the parameter setting device 10, the numerical controller 14, and the machine 20 are integrated together.

What is claimed is:

1. A parameter setting device configured to set parameters for driving a machine in which a numerical controller is incorporated, comprising:
    a machine configuration file in which information is described pertaining to a configuration of the machine;
    a parameter generating unit configured to generate parameters for driving the machine, based on the machine configuration file; and
    a parameter setting unit configured to set the generated parameters in the numerical controller, wherein the machine configuration file contains:

order information including information of a model of the numerical controller, a type and number of motors, and a type and number of amplifiers;

connection information indicative of wire connections in the machine; and machine information including information of a configuration of axes of the machine, wherein the parameter setting device further comprises a file construction unit configured to acquire or generate the machine configuration file and wherein the file construction unit comprises a file supplementing unit having a supplementary table including the order information, the connection information, and the machine information, and in a case that a portion from among the order information, the connection information, and the machine information is insufficient in the machine configuration file that was acquired or generated by the file construction unit, the file supplementing unit supplements the insufficient portion of the information automatically from the supplementary table and, wherein the file supplementing unit, when automatically supplementing the insufficient portion of the information from the supplementary table, in a case that information requiring confirmation by an operator is to be added, adds information indicative of non-confirmation to the machine configuration file; and the parameter generating unit, when generating the parameters for driving the machine, generates a parameter indicative of non-confirmation, based on the information indicative of non-confirmation.

2. The parameter setting device according to claim 1, wherein the parameter setting device further comprises an automatic setting unit configured to automatically generate the machine configuration file with the file construction unit, and to supply the machine configuration file to the parameter generating unit.

3. The parameter setting device according to claim 1, wherein the file construction unit includes a storage medium in which there is stored as a sample the machine configuration file of a typical machine, and acquires the machine configuration file that is stored in the storage medium.

4. The parameter setting device according to claim 3, wherein:

the storage medium stores as samples a plurality of the machine configuration files; and the file construction unit comprises a sample selection unit configured to acquire a machine configuration file selected by an operator from among the plurality of the machine configuration files that are stored in the storage medium.

5. The parameter setting device according to claim 1, wherein the file construction unit comprises an inverse conversion unit configured to acquire parameters of a similar machine, and to perform conversion from the acquired parameters into the machine configuration file.

6. The parameter setting device according to claim 1, wherein the file construction unit comprises a file acquisition unit configured to acquire the machine configuration file that was already created.

7. The parameter setting device according to claim 1, wherein the file construction unit comprises a file editing unit configured to edit or check the machine configuration file that was acquired or generated.

8. The parameter setting device according to claim 1, wherein:

the parameter setting device further comprises a model selecting unit configured to select a different model of the numerical controller; and the parameter generating unit includes a conversion table for each model selected by the model selecting unit, and generates the parameters from the machine configuration file on basis of the conversion table of the selected model.

9. The parameter setting device according to claim 1, wherein the parameter setting device further comprises an output unit configured to output the machine configuration file to the numerical controller.

10. A parameter setting method for setting parameters for driving a machine in which a numerical controller is incorporated, comprising:

a step of acquiring or generating a machine configuration file in which information is described pertaining to a configuration of the machine;

a parameter generating step of generating, by a parameter generating unit of a device, parameters for driving the machine based on the machine configuration file; and a parameter setting step of setting, by a parameter setting unit of a device, the generated parameters in the numerical controller, wherein the machine configuration file contains:

order information including information of a model of the numerical controller, a type and number of motors, and a type and number of amplifiers;

connection information indicative of wire connections in the machine; and machine information including information of a configuration of axes of the machine, wherein the parameter setting device further comprises a file construction unit configured to acquire or generate the machine configuration file and wherein the file construction unit comprises a file supplementing unit having a supplementary table including the order information, the connection information, and the machine information, and in a case that a portion from among the order information, the connection information, and the machine information is insufficient in the machine configuration file that was acquired or generated by the file construction unit, the file supplementing unit supplements the insufficient portion of the information automatically from the supplementary table and, wherein the file supplementing unit, when automatically supplementing the insufficient portion of the information from the supplementary table, in a case that information requiring confirmation by an operator is to be added, adds information indicative of non-confirmation to the machine configuration file; and the parameter generating unit, when generating the parameters for driving the machine, generates a parameter indicative of non-confirmation, based on the information indicative of non-confirmation.

* * * * *